June 29, 1948.
J. H. REISNER ET AL
2,444,368
METHOD OF MAKING ELECTRON DIFFRACTION
PATTERNS OF FUSIBLE SPECIMENS
Filed March 12, 1946
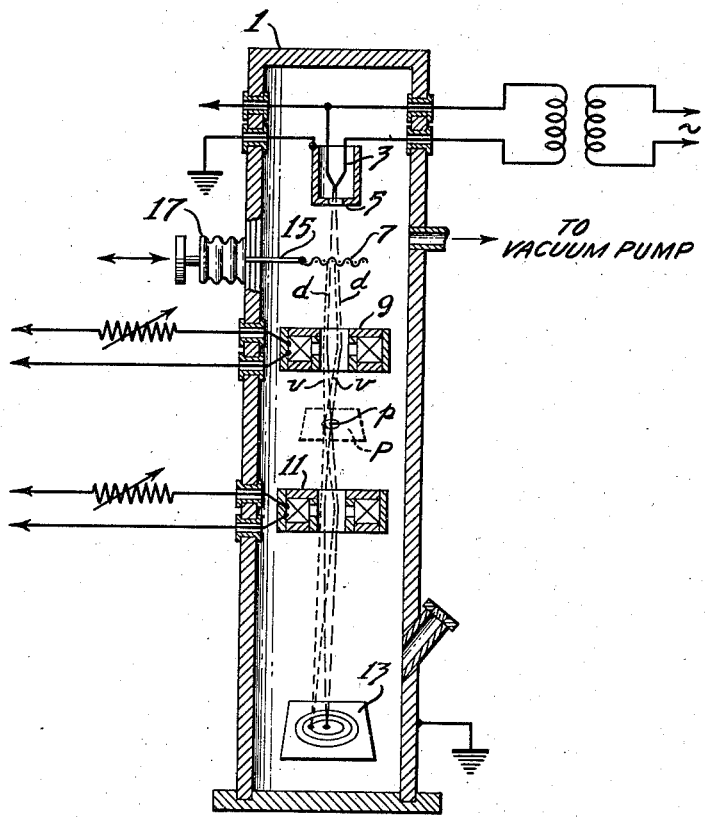
INVENTORS.
John H. Reisner
& Robert G. Picard
BY
ATTORNEY Patented June 29, 1948

2,444,368

UNITED STATES PATENT OFFICE 2,444,368

METHOD OF MAKING ELECTRON DIFFRACTION PATTERNS OF FUSIBLE SPECIMENS

John H. Reisner, Haddonfield, and Robert G. Picard, Collingswood, N. J., assignors to Radio Corporation of America, a corporation of Delaware Application March 12, 1946, Serial No. 653,802

6 Claims. (Cl. 250—49.5)

Our invention relates to the art of ascertaining the atomic structure of materials and has special reference to an improved method of making visible electron diffraction patterns of fusible materials.

The superior resolving power of electrons, as compared with X-rays, recommends the use of an electron beam or "probe" in diffraction work. However, up to now the use of electron probes has been limited practically entirely to the examination of infusible or difficultly fusible solids such, for example, as silica, metals and other inorganic materials. This is so because the kinetic energy of electrons is dissipated very rapidly in the form of heat and because bombardment of the specimen must continue throughout the period that it takes the photographic or fluorescent target to convert the electron diffraction pattern into a useful visible image. Accordingly, the principal object of our present invention is to provide a method of producing visible electron diffraction patterns of materials of the kind that are fused or otherwise destroyed when subjected to electron bombardments of ordinary intensity and duration.

Another and important object of our invention is to achieve the foregoing principal object in a facile manner and with but little or no alteration in existing electronic equipment.

Our invention is predicated upon an appreciation of two facts: (1) That in any electron diffraction device the diffraction patterns, per se, are formed (in space) substantially instantaneously, i. e., in the very brief period of time it takes for a given family of electrons to travel from their source to, and a limited distance away from, the specimen. (2) That every electron diffraction pattern is a duplicate of every other pattern of the same material. It follows, therefore, that a composite image of a multiplicity of discrete diffraction patterns each individual to a different elemental area of the specimen will exhibit the same characteristics as a diffraction pattern formed in the usual way, i. e., by continuous bombardment of a single elemental area of the specimen.

Accordingly, in carrying our invention into effect we expose different elemental areas of the specimen, successively, to the electron beam each for a period of time sufficient to produce, in space, a diffraction pattern of a given elemental area, yet not so long as to fuse or destroy any part of the specimen material, and we continue making such successive exposures until the total period of time to which all of the said elemental areas are exposed is sufficient to produce, upon a suitable target, a composite visual image of the several electron diffraction patterns resulting from the bombardment of the said different elemental areas of the specimen.

Any electron diffraction camera having a specimen holder permitting one or more motional degrees of freedom may be employed in the practice of our invention. We may employ a "transmission type" camera having an auxiliary lens intermediate the focal plane and electron targets (as claimed by Picard in copending application Ser. No. 596,476). A camera of this type is capable of producing electron diffraction patterns of sufficient resoultion to permit the study of materials having long interatomic ($d_{hkl}$) spacings. As shown in the drawing, such an electron diffraction camera may comprise an evacuable chamber I containing a cathode 3, an apertured paraxial beam forming anode 5, a movable specimen holder 7, a first magnetic lens 9, a second magnetic lens 11 and a target 13, all arranged, in the order named, along the central electron axis of the chamber. The target 13 may comprise either a fluorescent screen, a photographic plate, or an electrical type of charge collector, e. g., a Faraday cage. Here, as in the Picard disclosure, the usual pole pieces have been removed from the objective lens 9; whereby the electrons from the cathode are formed into an image of the apertured plate of "virtual source" 5 at a point $p$ beyond the lens 9.

The specimen holder in the illustrated transmission type camera comprises a wire screen or grate 7 upon which the specimen is deposited in the usual way (i. e., on a collodion film). We may employ any suitable means for imparting the movement required to prevent the specimen from being destroyed by electron bombardment. In the instant case the mechanism for moving the specimen holder 7 comprises simply a rod-like support 15 which extends through a flexible vacuum-tight seal or bellows 17 in the wall of the chamber 1. The force for moving the holder may be applied to the outer end of the rod 15 either manually or by means of a driving motor. In the latter case the driving motor may comprise a clock-work mechanism, or it may be of the type used in the scanning microscope of Snyder 2,330,930 or Hillier 2,330,888.

As long as one or more elemental areas of the specimen is in the path of the beam some of the impinging electrons will be diffracted and directed along the optic axis of the instrument by the same lens (9) that serves to focus the image of the source 5 at the point $p$. These diffracted rays are formed into an electron pattern which is in focus only in a plane P which is normal to the optic axis and contains the point $p$. By moving the specimen holder 7 across the path of the beam so that different elemental areas of the specimen are presented to the beam a succession of duplicate discrete diffraction patterns are formed successively in the said plane P and are directed to the target 13 by the magnetic lens 11. When the target 13 comprises a fluorescent screen we continue to move the specimen throughout the viewing interval, or until the beam is turned off. When the target 13 comprises a photographic plate the movement of the specimen holder should be continued throughout the period during which the plate or film is exposed to the beam.

It will now be apparent that we have provided a simple and convenient method of producing visible (i. e., photographic or fluorescent) electron diffraction patterns of substances of the kind that will fuse when subjected to electron bombardments of the intensity and duration normally employed in electron diffraction apparatus.

What we claim is:

1. In the art of ascertaining the atomic structure of a substance, the steps which comprise producing a succession of electron diffraction patterns individual to different elemental areas of said substance and converting said series of electron diffraction patterns into a composite visible image.

2. The invention as set forth in claim 1 and wherein said composite visible image is produced photographically.

3. In the art of ascertaining the atomic structure of a substance, the steps which comprise producing, in space, a rapid succession of electron diffraction patterns individual to different elemental areas of said substance and concomitantly converting said series of electron-diffraction patterns into a composite visible image.

4. In the art of ascertaining the atomic structure of a substance, the steps which comprise generating a paraxial electron beam, presenting different elemental areas of said substance to said electron beam to produce in space a series of electron diffraction patterns individual to said different elemental areas of said substance, and converting said series of electron diffraction patterns into a composite visible image.

5. The invention as set forth in claim 4 and wherein the period of time during which any elemental area of said substance is exposed to said paraxial electron beam is insufficient to destroy said substance.

6. In the art of obtaining a visible image of an electron diffraction pattern of a material of the kind that would be destroyed by electron bombardment of the intensity and duration normally required to produce such a visible image, the steps which comprise generating a paraxial electron beam of the said intensity, successively exposing different elemental areas of said material to said beam each for a period of time sufficient to produce a diffraction pattern thereof yet not so long as to destroy said material, and continuing such exposure until the total period of time to which all of said elemental areas are exposed is sufficient to produce a composite visual image of the several electron diffraction patterns resulting from the bombardment of the said different elemental areas of said material.

JOHN H. REISNER.
ROBERT G. PICARD.

REFERENCES CITED

The following references are of record in the file of this patent:

UNITED STATES PATENTS

| Number | Name | Date |
|---|---|---|
| 2,266,717 | Von Borries et al. | Dec. 16, 1941 |
| 2,360,677 | Hillier | Oct. 17, 1944 |

OTHER REFERENCES

Journal of Applied Physics, volume 13, Sept. 1942, pages 571–577. (Copy in Div. 54.)